United States Patent
Hadas et al.

(10) Patent No.: US 11,461,121 B2
(45) Date of Patent: Oct. 4, 2022

(54) GUEST-DRIVEN VIRTUAL MACHINE SNAPSHOTS

(71) Applicant: Red Hat, Inc., Raleigh, NC (US)

(72) Inventors: Arik Hadas, Herzliya (IL); Edward Haas, Petach Tikva (IL)

(73) Assignee: Red Hat, Inc., Raleigh, NC (US)

( * ) Notice: Subject to any disclaimer, the term of this patent is extended or adjusted under 35 U.S.C. 154(b) by 159 days.

(21) Appl. No.: 16/523,819

(22) Filed: Jul. 26, 2019

(65) Prior Publication Data

US 2021/0026675 A1    Jan. 28, 2021

(51) Int. Cl.
*G06F 9/455* (2018.01)
*G06F 9/54* (2006.01)
*G06F 9/48* (2006.01)

(52) U.S. Cl.
CPC ........ *G06F 9/45558* (2013.01); *G06F 9/4881* (2013.01); *G06F 9/54* (2013.01); *G06F 2009/4557* (2013.01); *G06F 2009/45583* (2013.01)

(58) Field of Classification Search
CPC ...... G06F 9/45558; G06F 9/4881; G06F 9/54; G06F 2009/4557; G06F 2009/45583
See application file for complete search history.

(56) References Cited

U.S. PATENT DOCUMENTS

| | | | |
|---|---|---|---|
| 8,516,210 B2 | 8/2013 | Buragohain et al. | |
| 8,725,971 B2* | 5/2014 | Nakamura | G06F 3/061 711/162 |
| 9,471,441 B1 | 10/2016 | Lyadvinsky et al. | |
| 9,477,415 B2 | 10/2016 | Hsu et al. | |
| 9,507,672 B2* | 11/2016 | Ye | G06F 9/461 |
| 10,061,656 B2* | 8/2018 | Zou | G06F 11/1461 |
| 2015/0378636 A1 | 12/2015 | Yadav et al. | |
| 2017/0075912 A1 | 3/2017 | Michael et al. | |
| 2019/0065323 A1* | 2/2019 | Dhamdhere | G06F 9/455 |
| 2019/0227878 A1* | 7/2019 | Agarwal | G06F 11/1448 |
| 2019/0243683 A1* | 8/2019 | Botelho | G06F 9/4881 |
| 2021/0117294 A1* | 4/2021 | Mitkar | G06F 3/0656 |

FOREIGN PATENT DOCUMENTS

WO    2017190758 A1    11/2017

OTHER PUBLICATIONS

Vmware, "Understanding VM Snapshots in ESXi / ESX" <https://kb.vmware.com/s/article/1015180>, last updated Mar. 6, 2019, 9 pages.
Kennedy, John; Satran, Michael, "Backing Up and Restoring Virtual Machines" <https://docs.microsoft.com/en-us/windows/desktop/hyperv_v2/backing-up-and-restoring-virtual-machines>, May 31, 2018, 4 pages.

* cited by examiner

*Primary Examiner* — Jacob D Dascomb
(74) *Attorney, Agent, or Firm* — Lowenstein Sandler LLP

(57) ABSTRACT

Systems and methods include a snapshot interface to receive, from an application executing within a virtualized execution environment, a request to generate a snapshot of the virtualized execution environment. The snapshot interface forwards the request to generate the snapshot to a virtualization manager. The snapshot interface then receives, from the virtualization manager, a result of the request to generate the snapshot, the result indicating whether the snapshot was generated. Finally, the snapshot interface forwards, to the application, the result of the request.

16 Claims, 6 Drawing Sheets

GUEST-DRIVEN VIRTUAL MACHINE SNAPSHOTS

TECHNICAL FIELD

The present disclosure is generally related to computer systems, and more particularly, to virtual machine snapshot generation.

BACKGROUND

A virtual machine is a portion of software that, when executed on appropriate hardware, creates an environment allowing the abstraction of a physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests," providing a variety of functions such as virtualizing and allocating resources, context switching among virtual machines, etc. The operating system (OS) of the virtual machine is typically referred to as the "guest operating system."

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
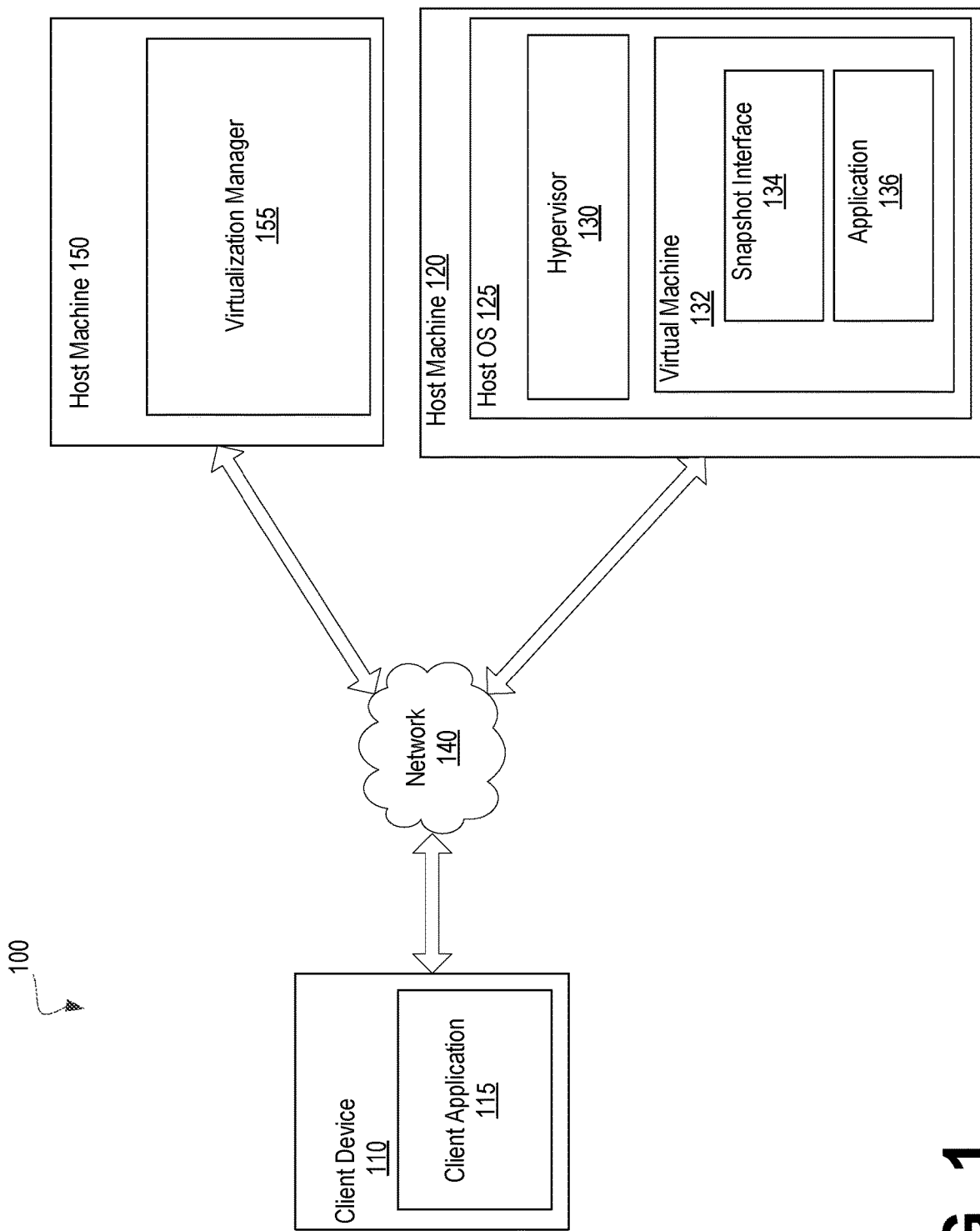
FIG. 1 depicts a system diagram of an example computer system architecture, in accordance with one or more aspects of the present disclosure.

Described herein are methods and systems for guest-driven virtual machine snapshot generation. A snapshot of a virtual machine may include at least part of the execution state of the virtual machine. For simplicity, examples of the present disclosure refer to virtual machines. However, the disclosure is not limited to virtual machines and any virtualized execution environment may also be used in place of a virtual machine. As referred to herein, a virtualized execution environment may be a virtual machine, a virtual container, a virtual OS, etc. The snapshot may include the state of the processor, memory, disks, and/or any other component of the virtual machine at the time that the snapshot is generated. Therefore, at a later time, the virtual machine may be restored to the saved state of the virtual machine included in the snapshot. For example, the virtual machine may be restored to the snapshot state if the virtual machine crashes during execution of a task, is not functioning properly, or if other issues arise.

Generally, initiation of snapshot creation is controlled by components that are external to the virtual machine for which the snapshot is created. For example, systems that monitor the execution of virtual machines may request that the virtualization manager generate a snapshot. Client devices interacting with a virtual machine may request a snapshot, or automation scripts may request snapshots (e.g., at specific intervals). However, systems that are external to the virtual machine do not always have adequate information about the execution of the applications executing within the virtual machine. Therefore, a snapshot might not be generated at the most opportune times. For example, although an application executing within the virtual machine is about to execute a highly risky task (e.g., a task or an operation that could cause the application or virtual machine to crash), the snapshot initiating external systems may be unable to initiate a snapshot prior to execution of the task because external systems are unaware of the execution of the application.

Aspects of the present disclosure address the above noted deficiency by providing for guest-driven virtual machine snapshots. A snapshot interface may be provided to an application executing within a virtual machine, through which the application may request a snapshot of the virtual machine. The snapshot interface may be an application programming interface (API) within the virtual machine that the application can interact with directly. The snapshot interface may be included in a guest agent of the virtual machine. The guest agent may be a software component of the virtual machine that communicates with the hypervisor and virtualization manager. The guest agent may receive information about the virtual machine and its environment from the virtualization manager or forward information from within the virtual machine to the virtualization manager. For example, the guest agent may monitor components of the virtual machine. The guest agent may provide information about the virtual machine to the virtualization manager in response to a request from the virtualization manager. In another example, the guest agent may forward snapshot requests received from an application executing within the virtual machine to the virtualization manager. Alternatively, the snapshot interface may be a separate component from the guest agent but may communicate with the guest agent. For example, the application may request a snapshot through the snapshot interface. The snapshot interface may then forward the request to the guest agent. The guest agent may then forward the request to the virtualization manager to execute an instruction to generate a snapshot of the virtual machine.

A filtering component, herein referred to as an "admission controller," may be included in the snapshot interface, the guest agent, the host machine, the virtualization manager and/or the hypervisor. The admission controller may filter requests based on individual applications. For example, the admission controller may allow requests only from applications that are authorized to make snapshot requests. For example the admission controller may only authenticate applications that an administrator authorizes or that are included in a list of authorized applications. In another example, the admission controller may authenticate an application unless it is included in a list of applications that are not authorized to request snapshots (e.g., known malware or other hostile applications). In addition, the admission controller may filter requests at the virtual machine level, at the node level, or the cluster level. The admission controller may filter the requests based on the network bandwidth necessary to create the requested snapshots. For example, the network bandwidth may only support the creation of a certain volume of snapshots (i.e., number of snapshots created per unit of time) depending on a threshold amount of data included in the snapshots. If the amount of data in the generated snapshots exceeds the amount of data supported by the network bandwidth then resource starvation may result. Thus, if the amount of data associated with potential snapshots to be created by the requests exceeds the threshold amount of data then the admission controller may cancel one or more of the received requests. Accordingly, the admission controller may allow only a threshold volume of requests to be executed. The admission controller may also monitor system usage data and adjust the filtering conditions accordingly at each level (e.g., virtual machine level, node level, and cluster level).

Each request may include metadata associated with the request. The metadata associated with a request may include the snapshot name for the request, a priority associated with the request, and/or a timeout value for the request. The snapshot name may uniquely identify the resulting snapshot generated by the virtualization manager. The priority level associated with the request may be used to prioritize execution of snapshot requests. Higher priority snapshot requests may be executed before lower priority requests. As described above, the admission controller may allow only a threshold volume of requests to be executed (i.e., threshold volume of snapshots to be created) based on network bandwidth availability. If more than the threshold volume of requests is received, then the requests with higher priority may be executed at the expense of lower priority requests. For example, if only five requests may be executed within a minute and six requests are received within a minute, then the five requests with the highest priority may be executed and the lowest may be filtered out. The timeout value may be a specified period of time that the virtualization manager is to wait for the application to complete execution of a task before automatically restoring the virtual machine to the state of the snapshot.

In an illustrative example, an application may approach an operation that needs to be executed but that is deemed to be risky. The application may then request, through a snapshot interface of the virtual machine, for a snapshot to be created before it executes the risky operation. As discussed above, the snapshot interface may forward the request from the application to the virtualization manager and the virtualization manager may generate a snapshot of the virtual machine. The application may wait for a confirmation that the snapshot has been created and then proceed to execute the risky operation. If the risky operation fails or causes issues with the application or the virtual machine (e.g., crashing the application or virtual machine, causing an error state, infinite loop, freezing, etc.) then the virtualization manager may use the snapshot to restore the virtual machine to the state of virtual machine saved in the snapshot. In one example, the virtualization manager may restore the virtual machine automatically after the timeout value received in the request expires. Aspects of the present disclosure are thus capable of providing an application executing within a virtual machine the ability to initiate a snapshot of the virtual machine. More particularly, aspects of the present disclosure can provide a fallback mechanism for applications executing risky operations within a virtual machine. Thus, the snapshot interface mitigates the negative effects of negative process flows associated with executing risky operations and increases the amount of information that can be received from within an executing virtual machine.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, computer system 100 may comprise one or more client devices 110 and one or more host machines 120 and 150, each connected to a network 140. Client device 110 may be a server, a workstation, a personal computer, a mobile phone, a palm-sized computing device, a personal digital assistant, and so on. Client device 110 may include a client application 115. Client application 115 may be any type of application such as a web application, a desktop application, a browser application, etc. Client application 115 may be used to interact with and control virtual machines executing on host machine 120.

The host machine 120 may be a server, a mainframe, a workstation, a personal computer (PC), a mobile phone, a palm-sized computing device, etc. Host machine 120 may include a system comprising one or more processors, one or more memory devices, and one or more input/output interfaces. The network 140 may be a private network (e.g., a local area network (LAN), a wide area network (WAN), intranet, etc.) or a public network (e.g., the Internet). Host machine 120 may execute one or more virtual machines 132 by executing a software layer referred to as hypervisor 130 on the host machine 120. The virtual machine 132 and hypervisor 130 may execute on a host operating system (OS) 125. Host OS 125 manages the hardware resources of the computer system and provides functions such as inter-process communication, scheduling, memory management, and so forth. Virtual machine 132 may be software that provides a virtualized execution environment which emulates the function of a physical computer system.

It should be noted that although, for simplicity, two host machines 120 and 150 are depicted in FIG. 1, in some other embodiments computer system 100 may comprise any number of host machines or even a plurality of clusters of host machines.

Host OS 125 may comprise a hypervisor 130, which provides a virtual operating platform for virtual machine 132 and manages its execution. It should be noted that in some alternative implementations, hypervisor 130 may be external to host OS 125, rather than embedded within host OS 125, or may replace host OS 125. Additionally, hypervisor 130 may be executed on a host separate from host machine 120 but connected to host machine 120 via a network connection (e.g., network 140).

Virtual machine 132 may comprise a guest operating system (not shown) that handles the execution of applications within the virtual machine, and one or more virtual processors (not shown). It should be noted that although, for simplicity, a single virtual machine 132 is depicted in FIG. 1, host machine 120 may host a plurality of virtual machines. Virtual machine 132 may include a snapshot interface 134 and an application 136. Although virtual machine 132 is depicted as including a single application 136, it should be noted that virtual machine 132 may execute a plurality of applications. In some instances, snapshot interface 134 may be included within a guest agent of the virtual machine 132. The guest agent may be a software component included in the virtual machine that allows the virtual machine 132 to communicate with the hypervisor 130 and virtualization manager 155. The guest agent may receive a request for the guest operating system executing within the virtual machine 132 to shut down. Additionally, the guest agent may forward information about the virtual machine 132 to the hypervisor 130 and the virtualization manager 155 executing on host machine 150.

The virtualization manager 155 may be one or more software modules being executed on the host machine 150 for centralized management of one or more host machines 120 executing one or more virtual machines 132. Virtualization manager 155 may comprise various interfaces, including an administrative interface, a reporting interface, and/or an application programming interface (API) to communicate with host machine 120. As described further below with respect to FIG. 2, virtualization manager 155 may include an admission controller to filter snapshot requests and a snapshot execution unit to generate virtual machine snapshots.

The snapshot interface 134 may be a standardized API that provides application 136 the ability to communicate with the virtualization manager 155. For example, the application 136 may send a request for the virtualization manager 155 to generate a snapshot of the virtual machine 132. The application 136 sends the request to the snapshot interface 134 which then forwards the request to the virtualization manager 155. In one example, the snapshot interface 134 may be included within the guest agent, which may expose the snapshot interface 134 to interact with applications executing within the virtual machine. The guest agent may be a software component of the virtual machine 132 that communicates with the hypervisor 130 and virtualization manager 155. The guest agent may receive a request for the guest operating system executing within the virtual machine 132 to shut down. In addition, the guest agent may also forward information from within the virtual machine 132 to the virtualization manager 155. The snapshot interface 134 may use the guest agent of the virtual machine 132 to forward the request to the virtualization manager 155. In another example, the snapshot interface 134 may be a separate component from the guest agent, or included in another component other than the guest agent that communicates with the guest agent. For example, the snapshot interface 134 may receive a snapshot request from an application 136 executing within the virtual machine 132 and then forward the snapshot request to the guest agent. The guest agent may then forward the snapshot request to the virtualization manager 155. Upon receiving the request from the snapshot interface 134, the virtualization manager 155 may then generate a snapshot of the virtual machine 132. In some instances, the snapshot interface 134 may provide functionality to forward additional types of requests or information from applications to the virtualization manager that may be useful.

Figure 2:
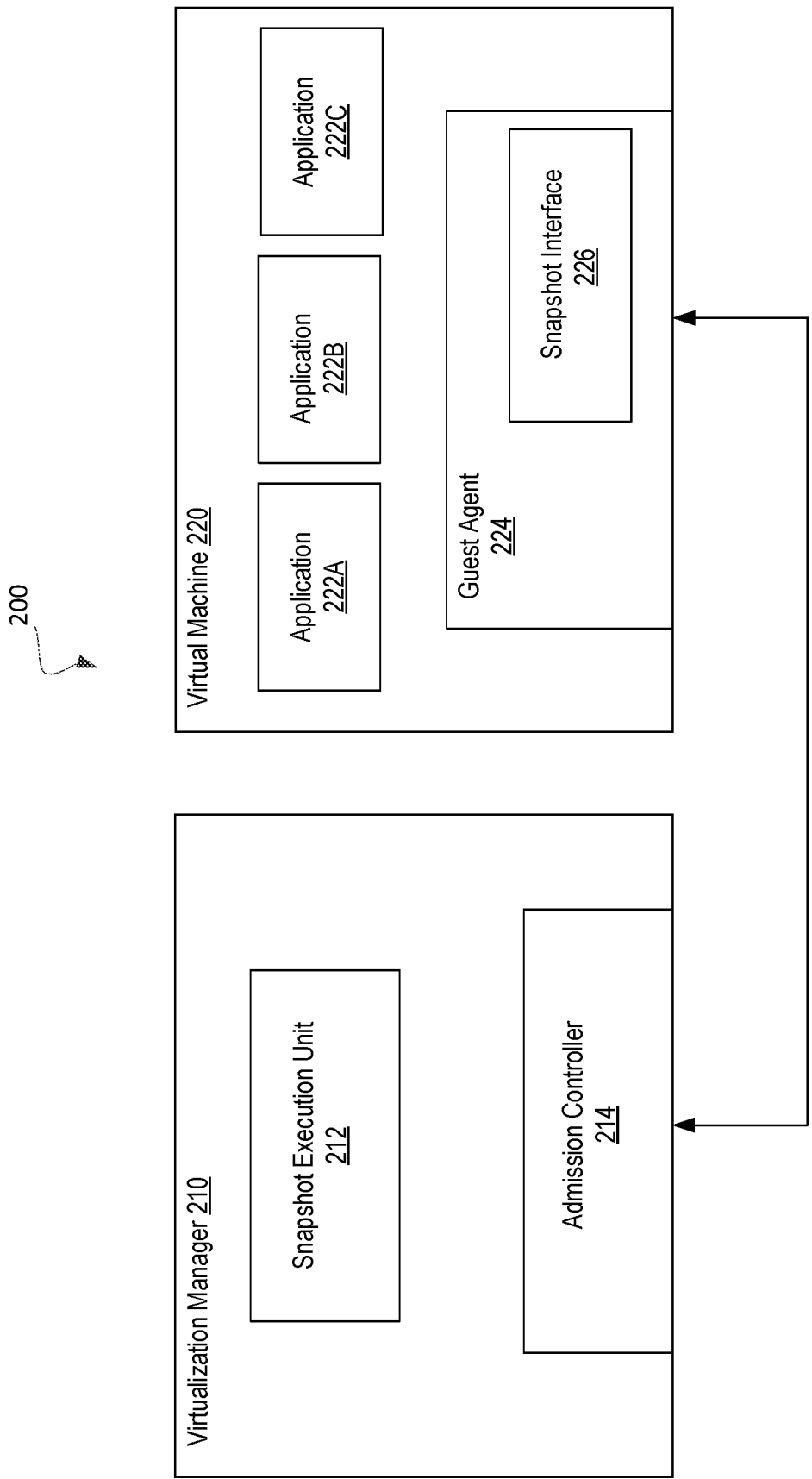
FIG. 2 depicts a block diagram of a virtualized system using guest-driven snapshot generation, in accordance with one or more aspects of the present disclosure.

FIG. 2 depicts a block diagram of a system 200 using guest-driven virtual machine snapshots, in accordance with one or more aspects of the present disclosure. As shown in FIG. 2, a virtualization manager 210 is communicatively coupled to a virtual machine 220. Virtualization manager 210 may the same or similar to virtualization manager 155, as described with respect to FIG. 1. Virtualization manager 210 includes a snapshot execution unit 212 and an admission controller 214. Virtual machine 220 may include one or more applications 222A-C, a guest agent 224, and a snapshot interface 226. Snapshot interface 226 may be included in guest agent 224. Alternatively, snapshot interface 226 may be a separate component from guest agent 224 but may still communicate with the guest agent 224. Guest agent 224 may be a software component of the virtual machine 220 used to communicate with the virtualization manager 210. The snapshot interface 226 may provide a standardized interface for applications 222A-C to request a snapshot be generated by the snapshot execution unit 212 of the virtualization manager 210. Snapshot execution unit 212 may execute requests to generate a snapshot of the state of virtual machine 220. Admission controller 214 may filter snapshot requests received from applications 222A-C based on a threshold volume of allowed requests (i.e., number of requests per unit of time), the volume of snapshot requests received at the admission controller 214, and a priority level of the requests received.

For example, applications 222A-C executing within virtual machine 220 may approach execution of an operation that needs to be executed but that could cause problems with execution of the application 222A-C or even the virtual machine 220 (e.g., cause the virtual machine to crash). In response, the application 222A-C may send a snapshot request to the snapshot interface 226 with which the applications 222A-C can interact directly. A component of the admission controller 214 (not depicted) located in the virtual machine 220 with the snapshot interface 226 may determine whether the application 222A-C is authorized to request a snapshot. For example, the admissions controller 214 may authorize the request if the application is not on an application "blacklist" that includes applications that are not allowed to request snapshots. In another example the admissions controller 214 may authorize the request only if the application is included in a list of applications that are explicitly allowed to request snapshots. If the application 222A-C is authorized to submit snapshot requests, then the snapshot interface 226 may provide the request to the guest agent 224. The guest agent 224 may then forward the request to the virtualization manager 210. Once the snapshot request is received by the virtualization manager 210, the admission controller 214 may determine, based on a threshold volume of allowed snapshot requests and a priority of the request, whether to allow the snapshot request to be forwarded to the execution unit 212 to generate a snapshot of the virtual machine 220. The admission controller 214 may filter received requests to allow only the threshold volume of requests received from the virtual machine 220 to go through to the snapshot execution unit 212. If the threshold volume of requests haven't been received from the virtual machine 220 then the request is forwarded to the snapshot execution unit 212 to be executed. Otherwise, if the threshold volume of requests have been received at the admission controller 214 then the request may be rejected. In another example, as described further with respect to FIG. 5, the admission controller 214 may filter the requests according to priorities associated with the requests, and ratings of the virtual machines from which they are received. In addition, the admission controller 214 may filter the requests at the virtual machine level, the node level, or the cluster level. For example, a policy rule enforced by the admission controller may allow only a first threshold number of requests from a virtual machine. Another policy rule may allow only a second threshold number of requests from a single host machine. Yet another policy rule may allow only a third threshold number of requests from a cluster of host machines.

The snapshot execution unit 212 of the virtualization manager 210 may create a snapshot by saving the current state of the virtual machine 220. For example, virtual disks of the virtual machine 220 may consist of a chain of one or more volumes that include the virtual machine's 220 operating system, applications 220A-C and data that make up the state of the virtual machine 220. At the time the snapshot is created, the volumes that the virtual disks of the virtual machine 220 consists of at that moment may become read-only volumes and a new volume to store changes to the virtual machine 220 may be created. Thus, the snapshot maintains the state of the original volumes and then any changes to the virtual machine 220 are copied to the new volume that is not part of the snapshot. When the virtualization manager 210 restores the virtual machine 220 to the snapshot state, the virtual machine 220 may simply disregard the changes stored in the new volumes. Therefore, a snapshot may be viewed as a storage function allowing creation of a restore point of a virtual machine's 220 operating system, memory state, applications, and data at a certain point in time.

Figure 3:
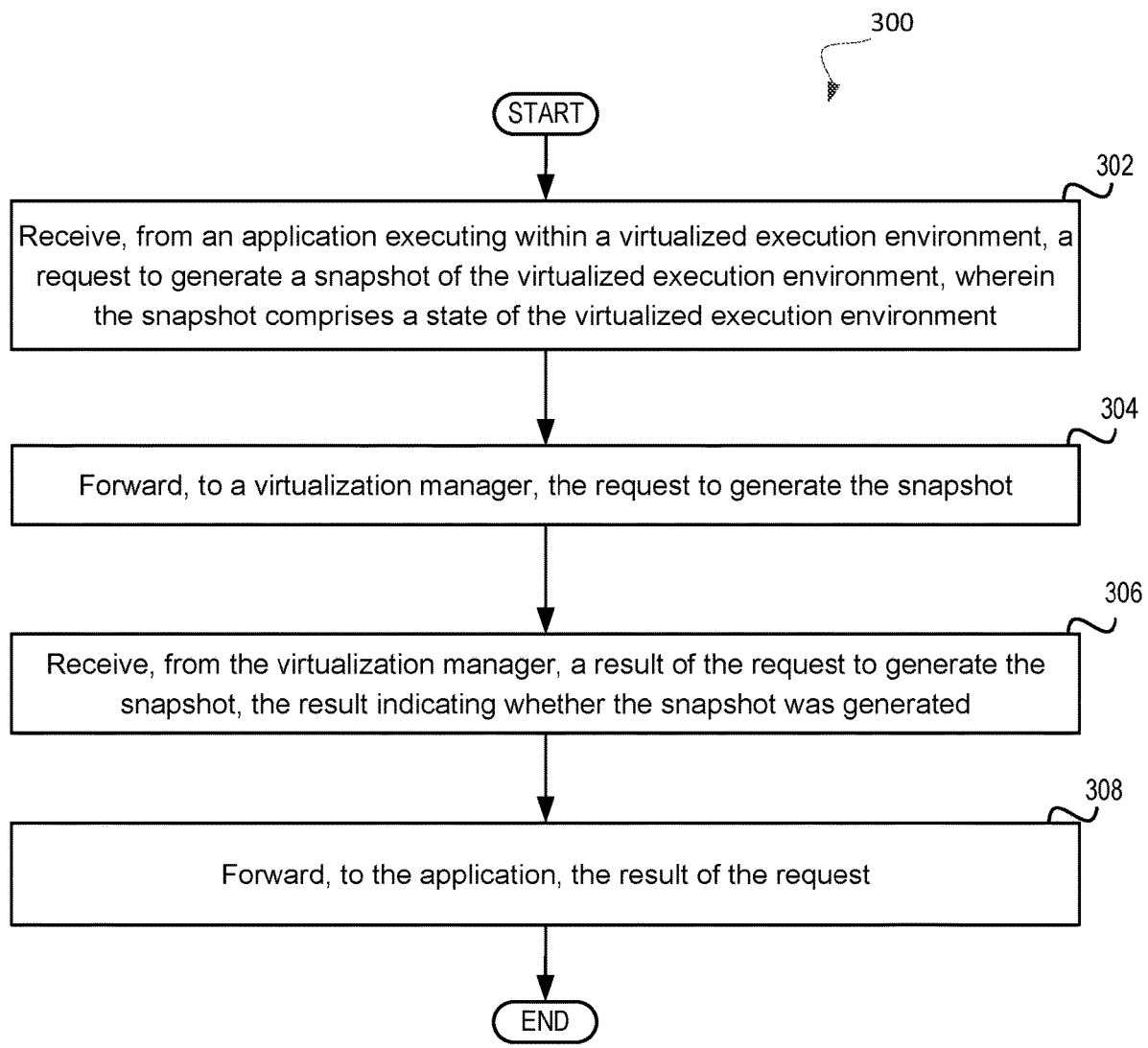
FIG. 3 depicts a flow diagram of a method for guest-driven virtual machine snapshot generation, in accordance with one or more aspects of the present disclosure.

FIG. 3 depicts a flow diagram of an example method 300 for generating a guest-driven virtual machine snapshot. The method may be performed by processing logic that may comprise hardware (circuitry, dedicated logic, etc.), software (such as is run on a general purpose computer system or a dedicated machine), or a combination of both. In one illustrative example, method 300 may be performed by snapshot interface 226 in FIG. 2. Alternatively, some or all of method 300 might be performed by another module or machine. It should be noted that blocks depicted in FIG. 3 could be performed simultaneously or in a different order than that depicted.

At block 302, the snapshot interface receives, from an application executing within a virtualized execution environment, a request to generate a snapshot of the virtualized execution environment, wherein the snapshot comprises a state of the virtualized execution environment. The snapshot interface may be a standardized interface that may be used by any application executing within a virtualized execution environment in which the snapshot interface is installed. Therefore, the snapshot interface may allow applications from across different virtualization platforms to use the standardized interface to request a snapshot of the virtualized execution environment in which the application is executing. The request may include a name of the request and/or a name of the snapshot to be generated by the request and a priority of the request. The priority of the request may indicate the relative importance of the request as compared to other requests. Thus, the priority may dictate an order of execution of received snapshot requests. The request may additionally include a timeout value. The timeout value may be a length of time that the virtualization manager is to wait after receiving the request before automatically restoring the virtualized execution environment to the state of the snapshot. However, if the application completes execution of the task associated with the timeout value then the application, through the snapshot interface, may instruct the virtualization manager to cancel the automatic restoration of the virtualized execution environment. The application may request the snapshot as it approaches execution of a risky task or operation that may cause the virtualized execution environment to crash or become corrupted.

At block 304, the snapshot interface forwards, to the virtualization manager, the request to generate the snapshot. The snapshot interface may be included in a guest agent of the virtual machine. The guest agent may be software that communicates with the virtualization manager. The guest agent may expose the snapshot interface to the application and forward the request to the virtualization manager. The snapshot interface may also be a separate component from the guest agent. The hypervisor may expose the snapshot interface to the application if the snapshot interface is a separate component from the guest agent. The snapshot interface may forward the request received from the application to the guest agent which then forwards the request to the virtualization manager.

At block 306, the snapshot interface receives, from the virtualization manager, a result of the request to generate the snapshot, the result indicating whether the snapshot was generated. The result received from the virtualization manager may indicate whether the virtualization manager generated the snapshot. In one example, the result may be a confirmation that the virtualization manager generated the snapshot, or a failure notification that the snapshot was not generated.

At block 308, the snapshot interface provides, to the application, the result of the request. If the result indicates that the snapshot was created, the application may proceed to execute. As discussed in block 302, the request sent to the virtualization manager may include a timeout value. When the application continues to execute, if the virtualization manager does not receive a notification that the risky task or operation was executed successfully, the virtual machine may automatically be restored to the state of the snapshot after the timeout expires. Otherwise, if execution of the code is successful then the virtualization manager may cancel the automatic restoration after receiving an indication from the application, through the snapshot interface that there was no issue with execution.

Figure 4:
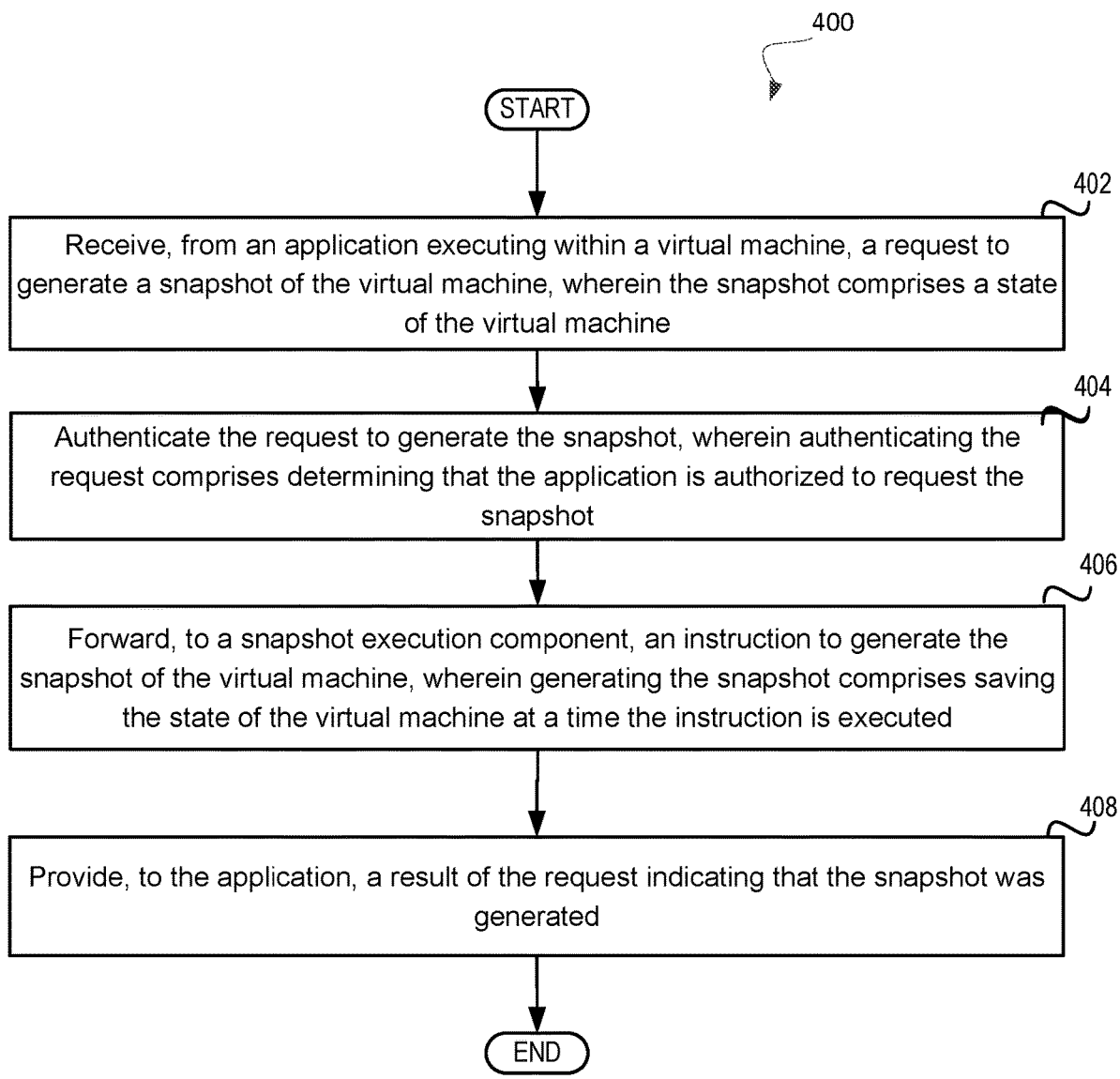
FIG. 4 depicts a flow diagram of another method for guest-driven virtual machine snapshot generation, in accordance with one or more aspects of the present disclosure.

FIG. 4 depicts a flow diagram of an example method 400 for generating a guest-driven virtual machine snapshot. The method may be performed by processing logic that may comprise hardware (circuitry, dedicated logic, etc.), software (such as is run on a general purpose computer system or a dedicated machine), or a combination of both. In one illustrative example, method 400 may be performed by an admission controller 214 of virtualization manager 210 in FIG. 2. Alternatively, some or all of method 400 might be performed by another module or machine. It should be noted that blocks depicted in FIG. 4 could be performed simultaneously or in a different order than that depicted.

At block 402, the admission controller receives, from an application executing within a virtual machine, a request to generate a snapshot of the virtual machine, wherein the snapshot comprises a state of the virtual machine. The admission controller may be a component of a virtualization manager to receive and filter snapshot requests from applications. The admission controller may authorize, filter, and forward requests received from virtual machines to a snapshot execution component of the virtualization manager.

At block, 404, the admission controller authenticates the request to generate the snapshot, wherein authenticating the snapshot comprises determining that the application that initiated the request is authorized to request the snapshot. The admission controller may authenticate the request by determining that a threshold volume of requests have not been received within a certain period of time. The threshold volume of requests may be determined by the network bandwidth necessary to create the threshold volume of snapshots. If the threshold volume of requests have not been received within the period of time then no requests are filtered out. The admission controller may also authenticate the application by determining that the application is not included in an applications blacklist consisting of applications that are not authorized to request snapshots (e.g., malicious applications). Similarly, the admission controller may authenticate the application by determine that the application is included in a list of applications authorized to request a snapshot. The admission controller may additionally filter requests based on a priority level associated with a request. The admission controller may forward requests with a higher priority level to the snapshot execution unit to be executed first. The admission controller may filter out requests with a lower priority level first if more than the threshold volume of requests are received.

At block 406, the admission controller forwards, to a snapshot execution unit, an instruction to generate a snapshot of the virtual machine, wherein generating the snapshot comprises saving the state of the virtual machine at the time the instruction is executed, as described above with respect to FIGS. 2 and 3. The saved state of the virtual machine may be used at a later time to restore the virtual machine to the saved state if the virtual machine, or an application executing within the virtual machine, encounters an error state. For example, the application may provide a timeout value with the request to generate a snapshot. Once the timeout lapses the virtualization manager may restore the virtual machine to the state of the snapshot. However, if the virtualization manager receives an indication to cancel the restoration (e.g., because the application successfully executed a risky task) then the virtualization manager may not restore the virtual machine when the timeout lapses.

At block 408, the admission controller provides, to the application, a result of the request, the result of the request indicating that the snapshot was generated. The application may then continue to execute in response to receiving the result. If the application then fails, the snapshot may be used to restore the virtual machine to the state saved in the snapshot (i.e., prior to the application's failure). In one example, the application is blocked from executing (e.g., by the snapshot interface) after initially sending the request until the virtualization manager provides the result of the request to the application. Once the virtualization manager provides the result of the request to the application, the application may then continue to execute. In another example, the application continues to execute while waiting for the virtualization manager to provide the result of the request unless the risky task is reached before the result is provided.

Figure 5:
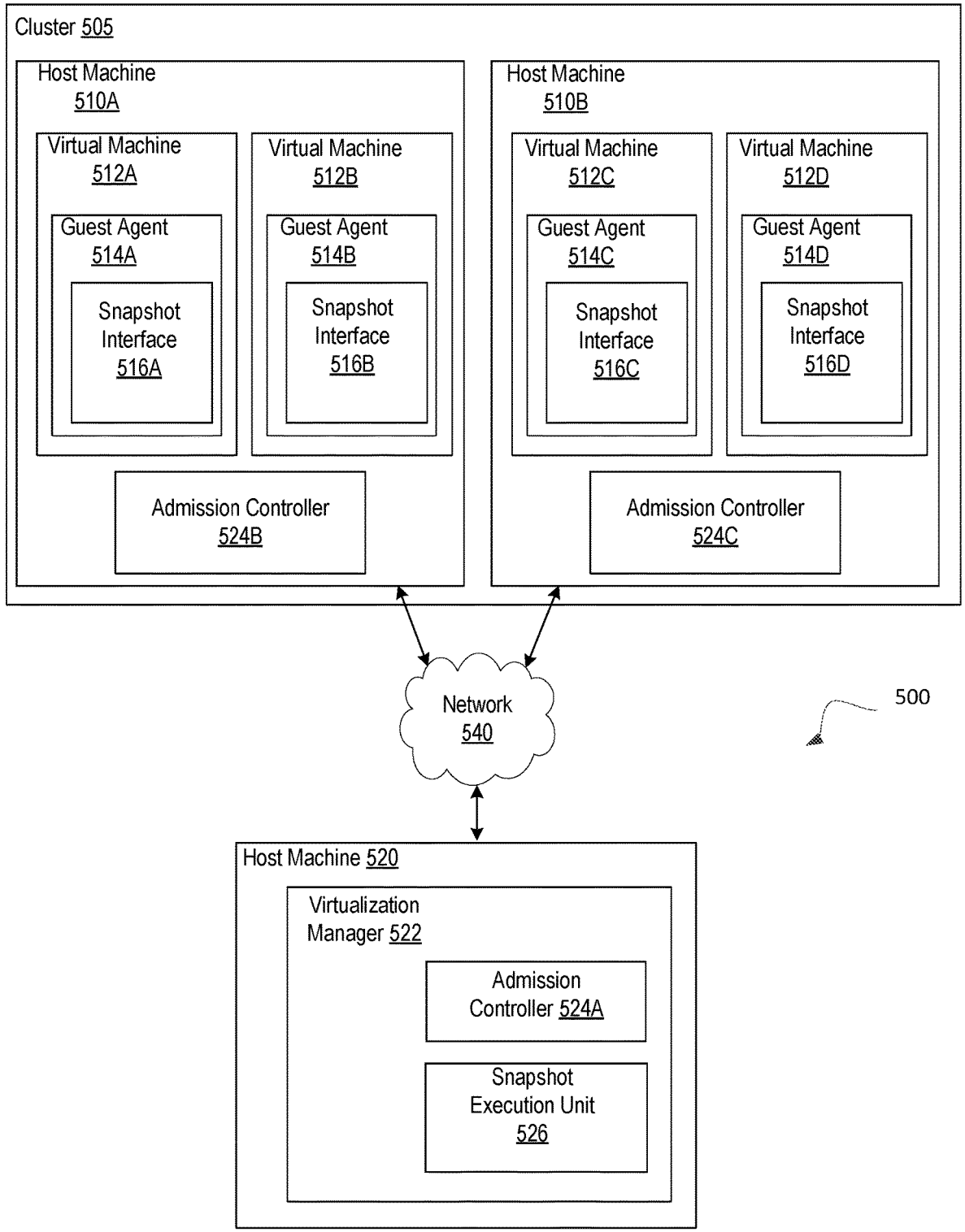
FIG. 5 depicts a block diagram illustrating a system of host machines with virtual machine snapshot request filtering, in accordance with one or more aspects of the present disclosure.

FIG. 5 depicts a component diagram illustrating a system 500 for guest-driven snapshot generation using an admission controller 524A-C to monitor and filter snapshot requests. The system 500 may include a cluster 505 of host machines 510A-B and a host machine 520 that may be separate from cluster 505 or included within the cluster 505. The host machines 510A-B of the cluster 505 and the host machine 520 may be connected to a network 540. The host machines 510A-B of the cluster 505 may include one or more virtual machines 512A-D executing on a respective host operating system of the host machines 510A-B. Virtual machines 512A-D may each include a guest agent 514A-D and a snapshot interface 516A-D, respectively. Although not depicted, each virtual machine may also execute one or more applications.

The cluster 505 may be a collection of host machines that are all interconnected to form a larger network of host machines. The virtual machines 512A-D may be virtualized execution environments that contain one or more processes and/or applications. Guest agent 514A-D may be a guest-level software component that receives information from the virtualization manager 522 and forwards snapshot requests from applications to the virtualization manager 522, as described above.

Snapshot interfaces 516A-D may be a standardized interface (e.g., an API) that allows applications executing within the virtual machines 512A-D to request a snapshot of the corresponding virtual machine on which it executes. The snapshot interfaces 516A-D may be an API that receives the snapshot requests from applications and forwards them to the virtualization manager 522 through the guest agent 514A-D. In some instances, the snapshot interface 516A-D, exposed to the application by a hypervisor, can forward the request directly to the virtualization manager 522. In yet another instance, the applications executing within the virtual machines 512A-D may transmit the request directly to the virtualization manager 522 without a snapshot interface.

Host machine 520 may include a virtualization manager 522. Virtualization manager 522 may in turn include an admission controller 524A and snapshot execution unit 526. Admission controller 524A may be a part of a larger distributed admission controller comprised of admission controller 524A of the virtualization manager 522, admission controller 524B of the host machine 510A, and admission controller 524C of host machine 510B.

Admission controller 524A-C may filter incoming snapshot requests at the cluster-level, node-level, virtual machine level, or application level. At each level, a maximum volume of snapshot requests may be defined so that the virtualization manager 522 is not overloaded with requests resulting in resource starvation. For example, for a ten second period, admission controller 524A may only allow two requests from each application, ten requests from each virtual machine, twenty five requests from each host machine, or node, and fifty requests in total from a cluster. Additionally, the admission controller 524A may disable requests granularly at each level for some period of time (e.g., can identify applications, virtual machines, nodes, or clusters from which requests are not allowed for the period of time).

Admission controllers 524B-C may be used to enforce a node-level filtering policy as well as virtual machine and application level filtering policies. The node level filtering policy may filter snapshot requests sent from applications and virtual machines that run on the node, or host machine. Admission controllers 524B-C may be installed directly on the host machines 510A-B as depicted, or may run within the virtual machines 512A-D executing on the host machines 510A-B. The number of requests that the admission controllers 524A-C admit may be predefined static thresholds. Alternatively, the admission controllers may monitor usage of resources of the host machines 510A-B to dynamically select a threshold number of requests to be allowed. For example, the system may calculate the consumption of the network bandwidth for host machines 510A-B and accordingly select the threshold volume of snapshots that can be created by the virtualization manager 522 for each host machine 510A-B.

Another aspect of admission controller filtering may include the use of priority levels associated with the requests to filter out less important requests. For example, snapshots that are generated as a regular part of system management may take priority over snapshot requests from applications. Thus, if more than the selected threshold number of requests are received, then the lower priority application requests may be filtered out first. Additionally, virtual machines may each have an associated priority level (e.g., platinum, gold, silver, etc.). Snapshot requests may then be filtered according to the priority level of the virtual machines from which the requests were received. For example, requests received from platinum virtual machines may take priority over requests received from gold and silver virtual machines. The priority levels may also be used to determine priority order of execution. Thus, higher priority requests may be executed before lower priority requests.

Figure 6:
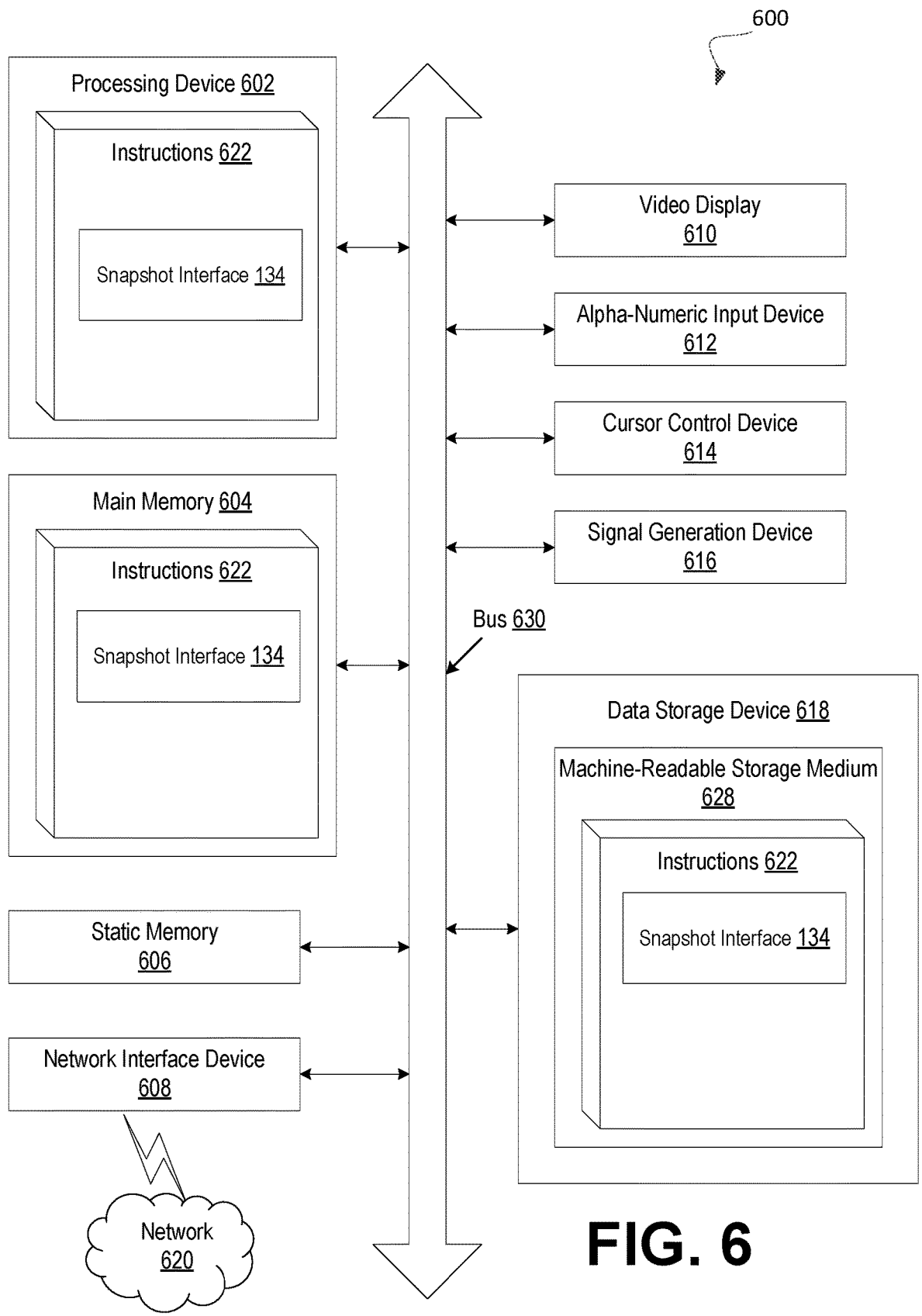
FIG. 6 depicts a block diagram of an illustrative computer system operating in accordance with one or more aspects of the present disclosure.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630. The processing device 602 may be operatively coupled with the main memory 604, static memory 606, and/or the data storage device 618.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a snapshot interface (e.g., snapshot interface 134 of FIG. 1) and/or a software library containing methods that call a snapshot interface. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "receiving," "executing," "returning," "loading," "associating," "granting," "sending," "writing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
receiving, by a processing device, from an application executing within a virtualized execution environment, a request to generate a snapshot of the virtualized execution environment, wherein the snapshot comprises a state of the virtualized execution environment, wherein the request is initiated by the application in response to approaching execution of an operation, wherein the request comprises a priority level of the request;
in response to receiving the request, blocking execution of the application until a result of the request is provided to the application;
forwarding, to a virtualization manager, the request to generate the snapshot;
receiving, from the virtualization manager, the result of the request to generate the snapshot, the result indicating whether the snapshot was generated in view of the priority level satisfying a threshold criterion; and
forwarding, to the application, the result of the request.

2. The method of claim 1, wherein receiving the request is performed by an application programming interface (API) exposed to the application by a hypervisor managing the virtualized execution environment.

3. The method of claim 1, wherein receiving the request is performed by an application programming interface (API) exposed to the application by a guest agent running within the virtualized execution environment.

4. The method of claim 1, further comprising:
providing, to the virtualization manager, an instruction to restore the virtualized execution environment to the state of the snapshot in response to expiration of a timeout value comprised by the request.

5. The method of claim 1, further comprising:
determining whether an amount of data associated with a plurality of potential snapshots to be generated by a plurality of requests received from applications executing within the virtualized execution environment exceeds a threshold amount; and
in response to the amount of data associated with the plurality of snapshots exceeding the threshold amount, cancelling one or more of the plurality of requests.

6. A system comprising:
a memory;
a first host system executing a virtual machine, wherein an application executes within the virtual machine;
a processing device operatively coupled to the memory and the first host system, the processing device to:
receive, from the application executing within the virtual machine, a request to generate a snapshot of the virtual machine, wherein the snapshot comprises a state of the virtual machine, wherein the request is initiated by the application in response to approaching execution of an operation, wherein the request comprises a priority level of the request;
authenticate the request to generate the snapshot, wherein authenticating the request comprises determining that the application is authorized to request the snapshot;
responsive to determining that the priority level satisfies a threshold criterion, forward, to a snapshot execution unit, an instruction to generate the snapshot of the virtual machine, wherein generating the snapshot comprises saving the state of the virtual machine at a time the instruction is executed; and provide, to the application, a result of the request indicating that the snapshot was generated.

7. The system of claim 6, wherein the processing device is to receive the request via an application programming interface (API) exposed to the application by a guest agent executing within the virtual machine.

8. The system of claim 7, wherein the processing device is further to:

determine whether more than a threshold volume of snapshot requests have been received at the API from a plurality of applications executing within the virtual machine; and in response to more than the threshold volume of snapshot requests having been received at the API, cancel one or more of the requests such that only the threshold volume of snapshot requests are forwarded to the snapshot execution unit.

9. The system of claim 6, wherein the processing device is further to:

determine whether more than a threshold volume of snapshot requests have been received from a first plurality of virtual machines executing on the first host system; and in response to more than the threshold volume of snapshot requests having been received from the first plurality of virtual machines executing on the first host system, cancel one or more of the requests such that only the threshold volume of snapshot requests are forwarded to the snapshot execution unit.

10. The system of claim 9, further comprising a second host system executing a second plurality of virtual machines, and wherein the processing device is further to:

determine whether more than a threshold volume of requests have been received from the first and second plurality of virtual machines executing on the first and second host systems; and in response to the threshold volume of requests having been received, forward only the threshold volume of requests to be executed by the snapshot execution unit.

11. The system of claim 10, wherein the processing device is further to:

determine a priority level associated with the request;

determine that the priority level associated with the request is greater than at least one other received request; and forward the request to the snapshot execution unit to be executed prior to the at least one other received request.

12. A non-transitory machine readable storage medium comprising executable instructions that, when executed by a processing device, cause the processing device to:

receive, from an application executing within a virtualized execution environment, a request to generate a snapshot of the virtualized execution environment, wherein the snapshot comprises a state of the virtualized execution environment, wherein the request is initiated by the application in response to approaching execution of an operation, wherein the request comprises a priority level of the request;

in response to receiving the request, block execution of the application until a result of the request is provided to the application;

forward, to a virtualization manager, the request to generate the snapshot;

receive, from the virtualization manager, the result of the request to generate the snapshot, the result indicating whether the snapshot was generated in view of the priority level satisfying a threshold criterion; and forward, to the application, the result of the request.

13. The non-transitory machine readable storage medium of claim 12, wherein the processing device is to receive the request from the application via an application programming interface (API) exposed to the application by a hypervisor managing the virtualized execution environment.

14. The non-transitory machine readable storage medium of claim 12, wherein the processing device is to receive the request from the application via an application programming interface (API) exposed to the application by a guest agent running within the virtualized execution environment.

15. The non-transitory machine readable storage medium of claim 12, the processing device further to:

provide, to the virtualization manager, an instruction to restore the virtualized execution environment to the state of the snapshot in response to expiration of a timeout value comprised by the request.

16. The non-transitory machine readable storage medium of claim 12, the processing device further to:

determining whether an amount of data associated with a plurality of potential snapshots to be generated by a plurality of requests received from applications executing within the virtualized execution environment exceeds a threshold amount; and in response to the amount of data associated with the plurality of snapshots exceeding the threshold amount, cancelling one or more of the plurality of requests.

* * * * *